United States Patent
Koshiishi

(10) Patent No.: US 11,040,424 B2
(45) Date of Patent: Jun. 22, 2021

(54) SPINDLE ABNORMITY DETECTION DEVICE

(71) Applicant: Fanuc Corporation, Yamanashi (JP)

(72) Inventor: Hikaru Koshiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/817,971

(22) Filed: Mar. 13, 2020

(65) Prior Publication Data

US 2020/0368870 A1    Nov. 26, 2020

(30) Foreign Application Priority Data

May 23, 2019    (JP) .............................. JP2019-096755

(51) Int. Cl.
   *B23Q 17/09*    (2006.01)
   *B23Q 17/10*    (2006.01)
   *B23Q 17/00*    (2006.01)

(52) U.S. Cl.
   CPC ......... *B23Q 17/0957* (2013.01); *B23Q 17/10* (2013.01); *B23Q 2017/001* (2013.01)

(58) Field of Classification Search
   None
   See application file for complete search history.

(56) References Cited

U.S. PATENT DOCUMENTS

| 2011/0230868 A1 | 9/2011 | Isobe et al. |
| 2017/0312875 A1 | 11/2017 | Kunihiro |

FOREIGN PATENT DOCUMENTS

| JP | 2004-042208 A |   | 2/2004 |
| JP | 2004042208 A | * | 2/2004 |
| JP | 2016-045151 A |   | 4/2016 |
| JP | 2016045151 A | * | 4/2016 |
| JP | 2017-007030 A |   | 1/2017 |
| JP | 2017-196721 A |   | 11/2017 |

* cited by examiner

*Primary Examiner* — Adolf DSouza
(74) *Attorney, Agent, or Firm* — Shackelford, Bowen, McKinley & Norton, LLP

(57) ABSTRACT

A spindle abnormity detection device includes a first sensor configured to measure oscillation of a spindle of a machine tool, a second sensor configured to measure radial runout of an axis of a tool unit attached to the spindle, and a computer configured to perform abnormity determination of the spindle based on an oscillation comparison result and a runout comparison result, the oscillation comparison result being obtained by comparing a detection result obtained by the first sensor with an oscillation standard of the spindle, the runout comparison result being obtained by comparing a detection result obtained by the second sensor with a runout standard of the tool unit.

7 Claims, 9 Drawing Sheets

FIG. 8

| ROTATION SPEED [rpm] | FREQUENCY No. | FREQUENCY [Hz] | ACCELERATION [m/s$^2$] | AMPLITUDE [μm] |
|---|---|---|---|---|
| 100 | S1 | 1.7 | ✽✽ | ✽✽ |
|  | S2 | 3.4 | ✽✽ | ✽✽ |
| ⋮ | ⋮ | ⋮ | ⋮ | ⋮ |
| 10000 | S1 | 167 | ✽✽ | ✽✽ |
|  | S2 | 334 | ✽✽ | ✽✽ |

FIG. 9

| ROTATION SPEED [rpm] | RUNOUT [μm] |
|---|---|
| 100 | ✽✽ |
| ⋮ | ⋮ |
| 10000 | ✽✽ |

FIG. 10

| ROTATION SPEED [rpm] | FREQUENCY No. | FREQUENCY [Hz] | ACCELERATION [m/s$^2$] | AMPLITUDE [μm] |
|---|---|---|---|---|
| 100 | F1 | 1.7 | ** | ** |
|  | F2 | 12.5 | ** | ** |
| ... | ... | ... | ... | ... |
| 10000 | F1 | 167 | ** | ** |
|  | F2 | 334 | ** | ** |

FIG. 11

| SCORE | VALUE OF Gn |
|---|---|
| 100 | Gn < S10% |
| 80 | S10% ≦ Gn < S20% |
| 60 | S20% ≦ Gn < S30% |
| 40 | S30% ≦ Gn < S40% |
| 0 | S40% ≦ Gn |

SPINDLE ABNORMITY DETECTION DEVICE

CROSS-REFERENCE TO RELATED APPLICATIONS

This application is based on and claims priority to Japanese Patent Application No. 2019-096755 filed on May 23, 2019, the content of which is incorporated herein by reference in its entirety.

TECHNICAL FIELD

The present invention relates to a spindle abnormity detection device.

BACKGROUND ART

Conventionally, there is known a machine tool that monitors changes in radial runout of an outer peripheral surface of a tool holder attached to a spindle. Such a machine tool is disclosed in PTL 1, for example.

CITATION LIST

Patent Literature

{PTL 1}
Japanese Unexamined Patent Application Publication No. 2004-42208

SUMMARY OF INVENTION

A spindle abnormity detection device according to one aspect of the present disclosure includes a first sensor configured to measure oscillation of a spindle of a machine tool, a second sensor configured to measure radial runout of an axis of a tool unit attached to the spindle, and a control unit configured to perform abnormity determination of the spindle based on an oscillation comparison result and a runout comparison result, the oscillation comparison result being obtained by comparing a detection result obtained by the first sensor with an oscillation standard of the spindle, the runout comparison result being obtained by comparing a detection result obtained by the second sensor with a runout standard of the tool unit.

BRIEF DESCRIPTION OF DRAWINGS

FIG. 8 is a table of an example of an oscillation detection result of the spindle abnormity detection device according to this embodiment.

FIG. 9 is a table of an example of a runout detection result of the spindle abnormity detection device according to this embodiment.

FIG. 10 is a table of an example of an oscillation detection result of the spindle abnormity detection device according to this embodiment.

FIG. 11 is a table of an example of an evaluative standard of an oscillation comparison result of the spindle abnormity detection device according to this embodiment.

DESCRIPTION OF EMBODIMENTS

Hereinafter, a spindle abnormity detection device 50 and a machine tool 1 according to an embodiment will be described with reference to the drawings.

Figure 1:
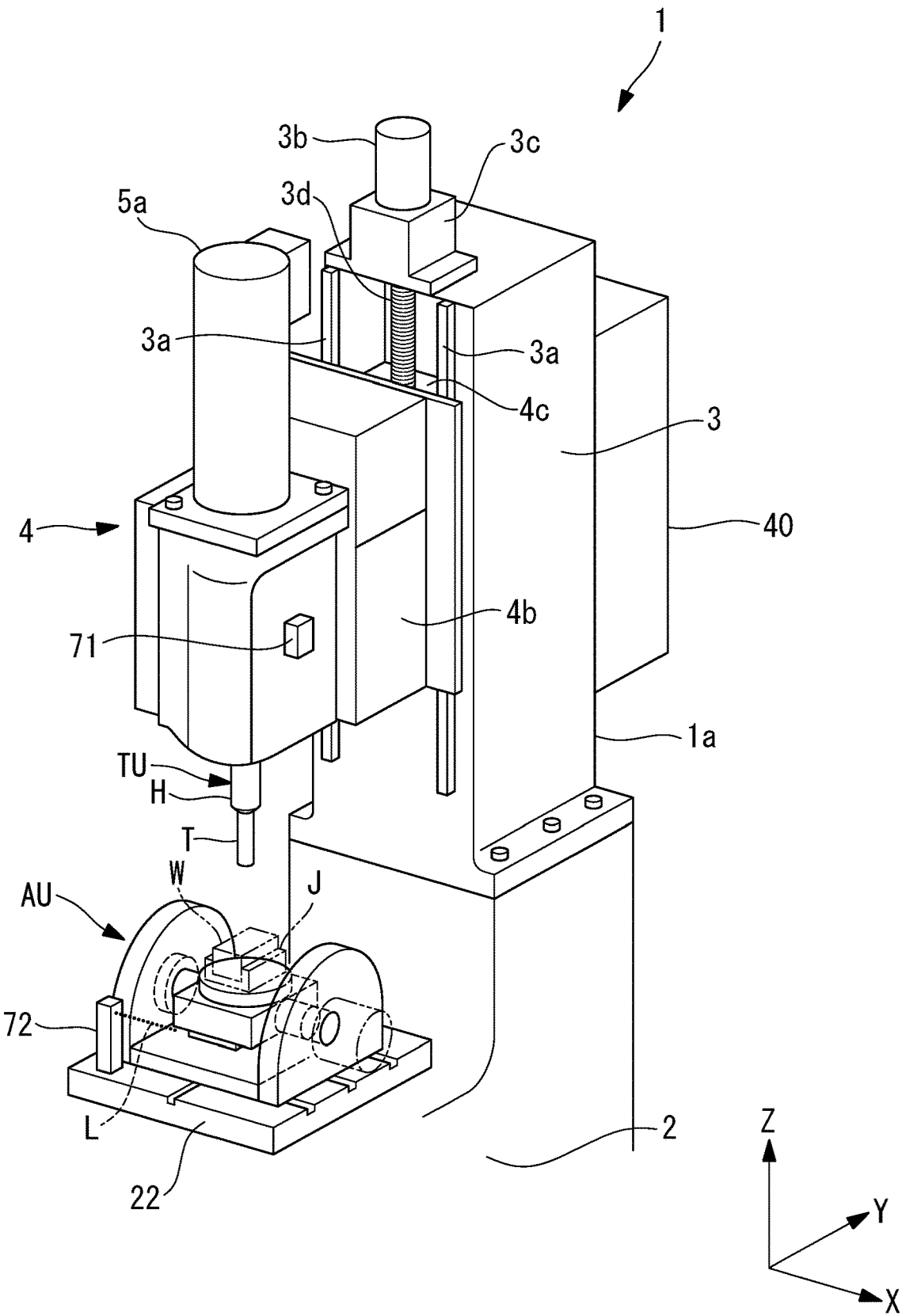
FIG. 1 is a schematic perspective view of a machine tool employing a spindle abnormity detection device according to an embodiment of the present invention.
Figure 3:
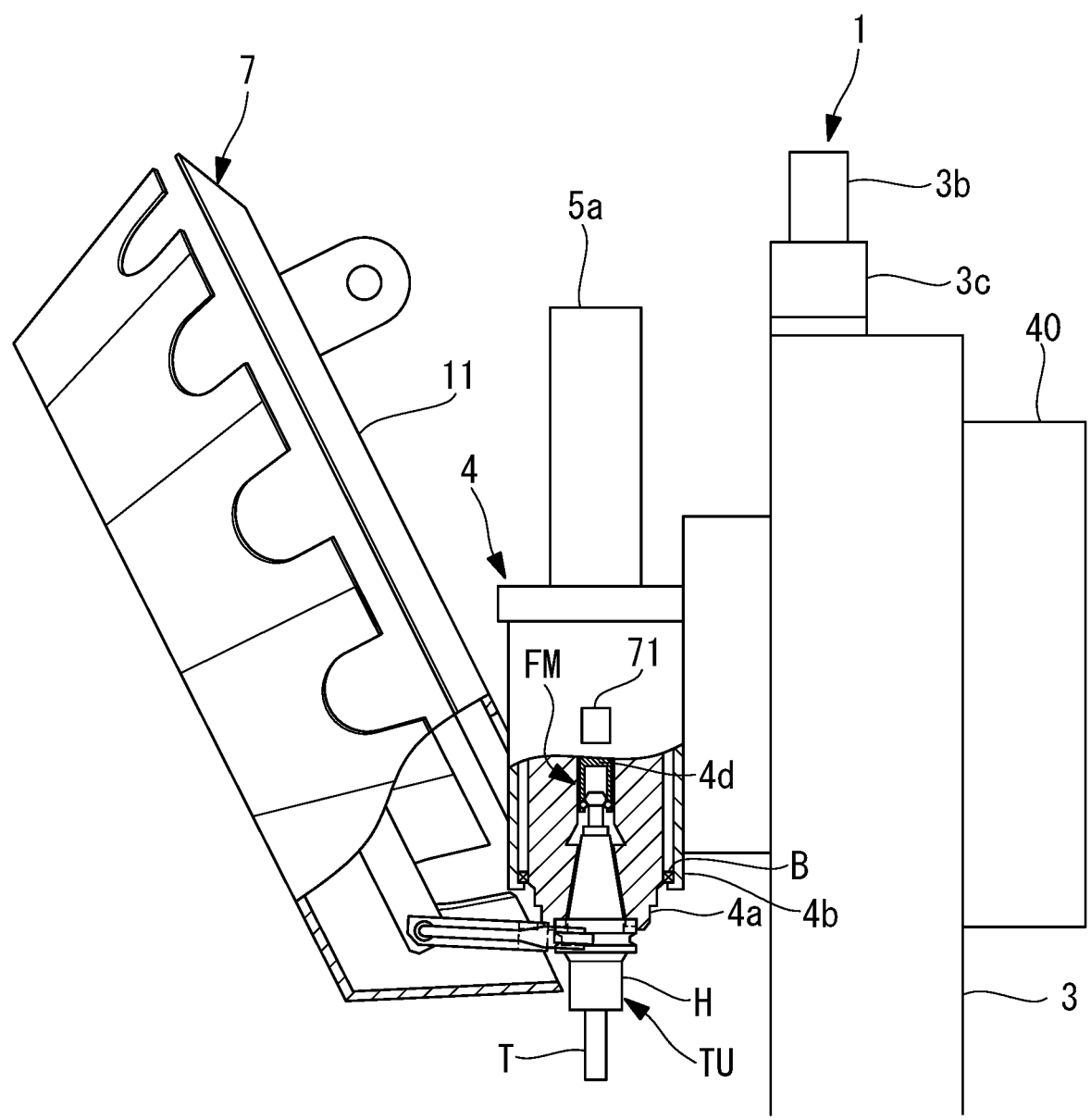
FIG. 3 is a schematic side view of the machine tool according to this embodiment.

As shown in FIG. 1, the machine tool 1 according to this embodiment includes: a machine tool main body 1a having a base 2 and a column portion 3 extending upward from the base 2; a spindle unit 4 supported on the column portion 3 so as to be movable vertically; and an X-Y table 22 that supports a workpiece W. As shown in FIG. 3, the machine tool 1 according to this embodiment also includes a tool magazine 7 for automatically changing a tool unit TU attached to a spindle 4a of the spindle unit 4. One of a plurality of tool units TU contained in the tool magazine 7 is selectively held by the spindle 4a. The spindle unit 4 includes a spindle head 4b that supports the spindle 4a via a plurality of bearings B. The tool unit TU includes a holder H fixed to the spindle 4a; and a tool T fixed to the holder H. A base end of the tool T is held by a collet portion of the holder H, and a tip end of the tool T is configured to cut the workpiece W.

The column portion 3 is provided with a plurality of guide rails 3a extending in a vertical direction (Z-axis direction), and the spindle head 4b is supported by the guide rails 3a so as to be movable in the vertical direction. Further, a Z-axis motor 3b such as a servo motor is fixed to the upper end of the column portion 3, and an output from an output shaft of the Z-axis motor 3b is transmitted to a ball screw 3d via a reducer 3c and the like. The ball screw 3d is disposed along the guide rails 3a, and threaded with a ball screw nut fixed to a back surface 4c of the spindle head 4b. With this configuration, the spindle unit 4 moves in the vertical direction by the rotation of the output shaft of the Z-axis motor 3b.

Further, the spindle 4a and the tool T rotate around the center axis line of the spindle 4a by a spindle motor 5a connected to an upper end of the spindle 4a.

The machine tool 1 relatively moves the workpiece W and the tool T by horizontal movement of the X-Y table 22, vertical movement of the spindle 4a, and the like, and thus performs machining to the workpiece W by the rotating tool T.

The base 2 is installed using a leveling bolt, an anchor bolt, or the like, for example, at a place where the machine tool 1 is used. The X-Y table 22 is positioned on the base 2, and the workpiece W is fixed on an upper surface of the X-Y table 22 via an additional axis unit AU, a jig J, or the like. The X-Y table 22 and the workpiece W are moved in a horizontal direction with respect to the spindle 4a by motors 13 and 23 provided on the base 2. The tool magazine 7 and the spindle head 4b are supported at an upper end of the column portion 3, and the tool magazine 7, the spindle 4a, and the spindle head 4b are arranged above the X-Y table 22.

Figure 2:
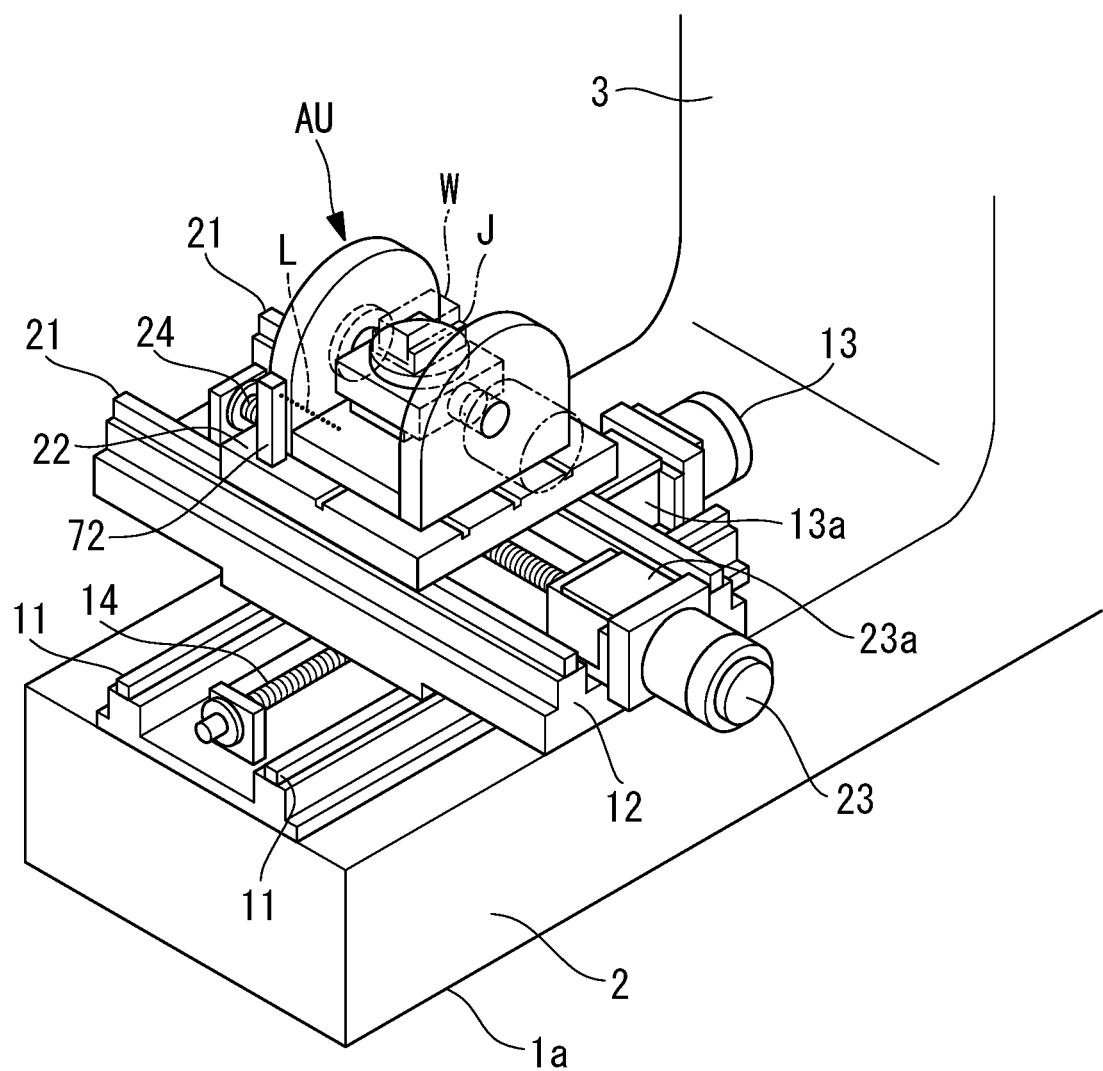
FIG. 2 is a schematic perspective view of a main part of the machine tool according to this embodiment.

As shown in FIG. 2, an upper surface portion of the base 2 is provided with a plurality of guide rails 11 extending in a Y-axis direction which is the horizontal direction, and a Y-direction movable portion 12 is supported by the guide rails 11 so as to be movable in the Y-axis direction. Further, a Y-axis motor 13 is fixed to the upper surface portion of the base 2, and an output from an output shaft of the Y-axis motor 13 is transmitted to a ball screw 14 via a reducer 13a and the like. The ball screw 14 is disposed along the guide rails 11, and threaded with a ball screw nut which is a part of the Y-direction movable portion 12. With this configuration, the Y-direction movable portion 12 moves in the Y-axis direction by the rotation of the output shaft of the Y-axis motor 13.

Further, as shown in FIG. 2, an upper surface portion of the Y-direction movable portion 12 is provided with a plurality of guide rails 21 extending in an X-axis direction which is the horizontal direction, and the X-Y table 22 is supported by the guide rails 21 so as to be movable in the X-axis direction. Further, an X-axis motor 23 is fixed to the upper surface portion of the Y-direction movable portion 12, and an output from an output shaft of the X-axis motor 23 is transmitted to a ball screw 24 via a reducer 23a and the like. The ball screw 24 is arranged along the guide rails 21, and threaded with a ball screw nut which is a part of the X-Y table 22. With this configuration, the X-Y table 22 moves in the X-axis direction by the rotation of the output shaft of the X-axis motor 23.

With the above configuration, the X-Y table 22 moves in the X-axis direction and the Y-axis direction with respect to the spindle 4a.

Figure 4:
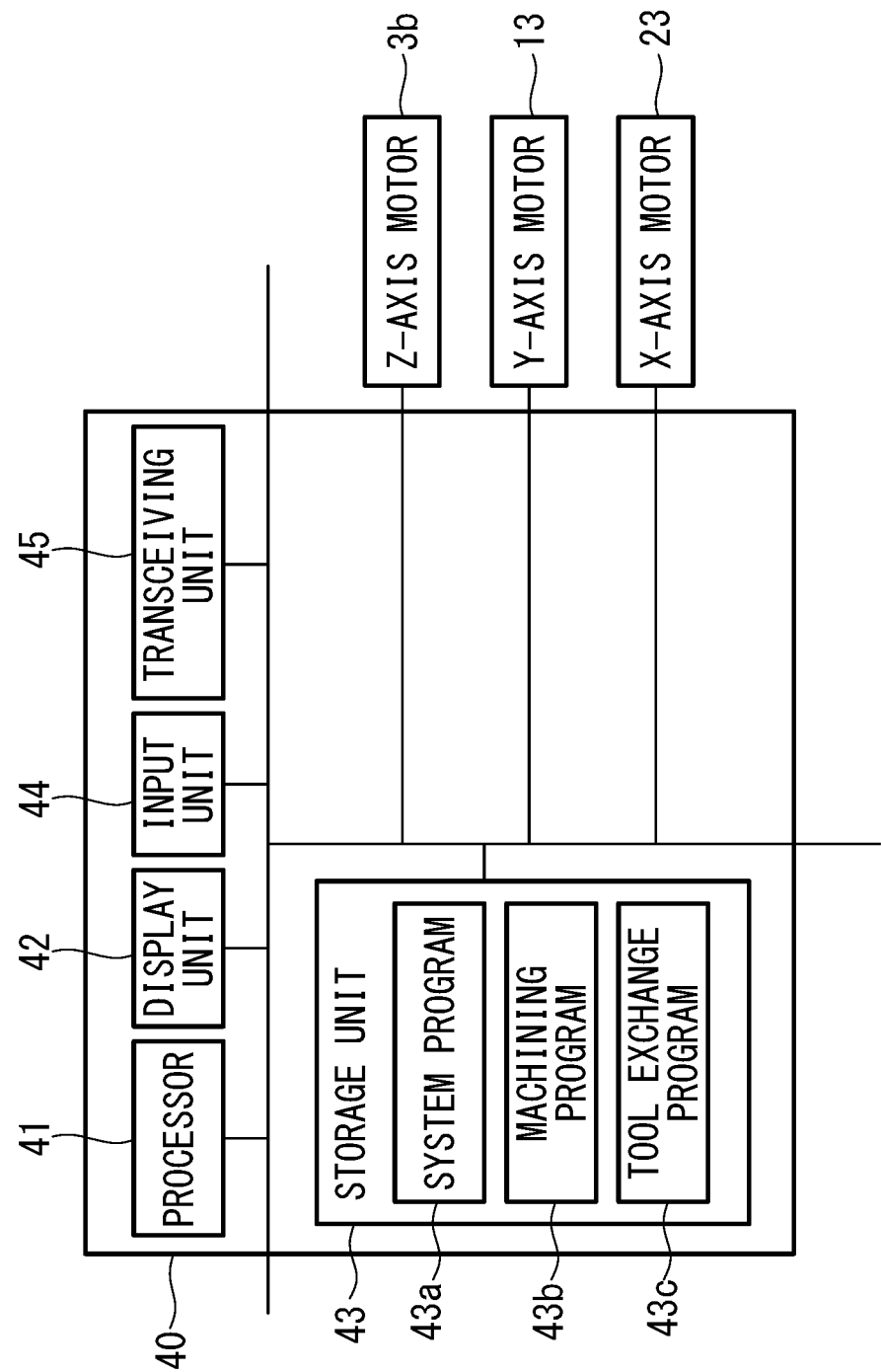
FIG. 4 is a block diagram of the machine tool according to this embodiment.

The machine tool 1 is provided with a controller 40 that controls the machine tool 1. As shown in FIG. 4, the controller 40 includes: a processor 41 such as a CPU; a display unit 42; a storage unit 43 having a nonvolatile storage, a ROM, and the like; an input unit 44 such as an operation panel; and a transceiving unit 45 having an antenna, a connector, and the like. The storage unit 43 stores a system program 43a, which carries out a basic function of the controller 40.

Further, the storage unit 43 stores a machining program 43b and a tool exchange program 43c. The controller 40 transmits control commands to the motor and the like based on the machining program 43b and the tool exchange program 43c, and with this, machining by the machine tool 1, exchange of the tool unit TU of the spindle 4a using the tool magazine 7, and the like are carried out.

Figure 5:
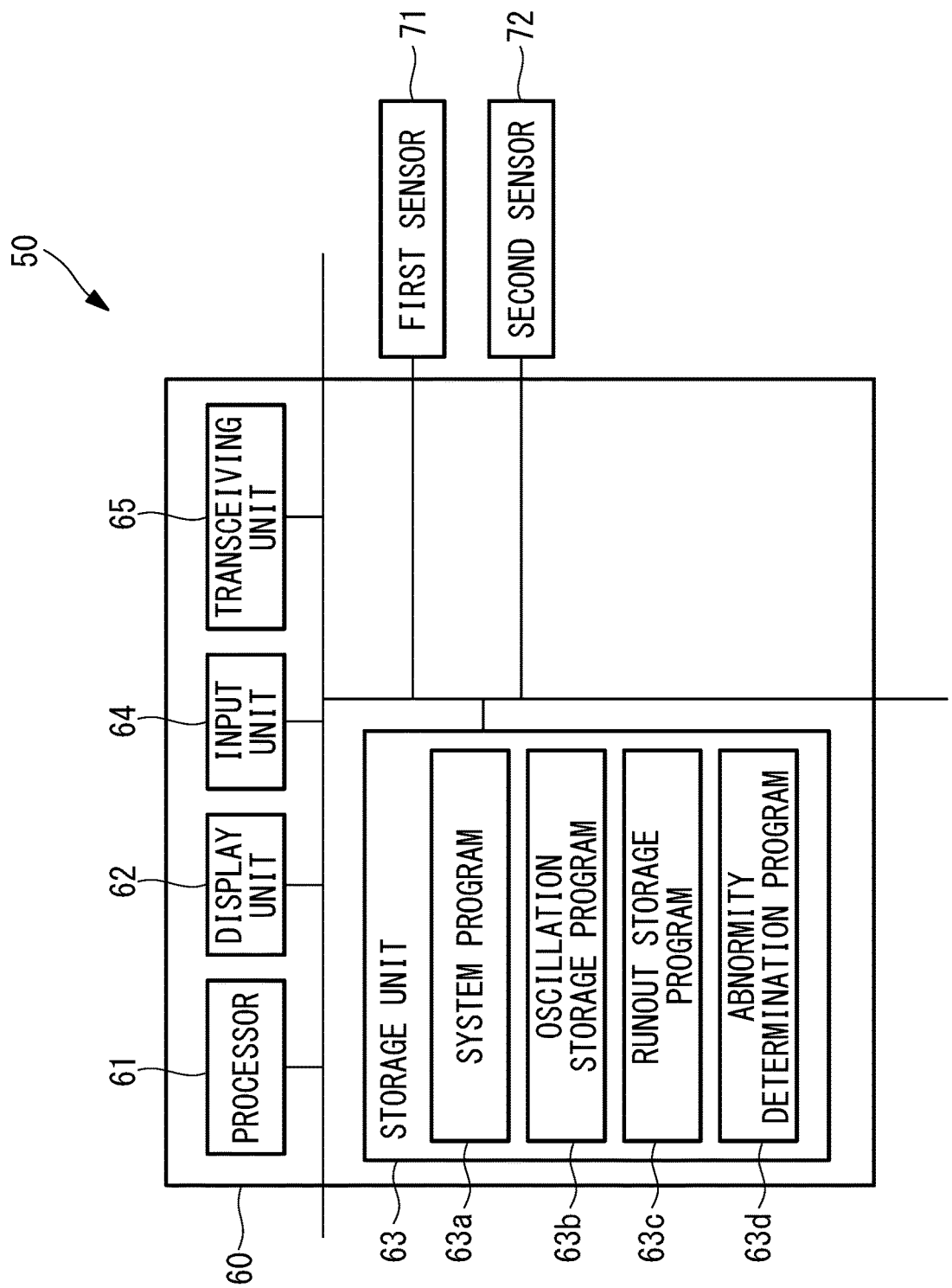
FIG. 5 is a block diagram of the spindle abnormity detection device according to this embodiment.

In one example, the spindle abnormality detection device 50 is provided with a computer (control unit) 60 such as a desktop computer, a laptop computer, a tablet computer, or the like. As shown in FIG. 5, the computer 60 includes: a processor 61 such as a CPU; a display unit 62; a storage unit 63 having a nonvolatile storage, a ROM, and the like; an input unit 64 such as a keyboard or a mouse; and a transceiving unit 65 having an antenna, a connector, and the like. The storage unit 63 stores a system program 63a, which carries out a basic function of the spindle abnormality detection device 50.

Further, the storage unit 63 stores an oscillation storage program 63b, a runout storage program 63c, and an abnormity determination program 63d.

As one example, the computer 60 is a management computer connected to the plurality of machine tools 1. In this case, the computer 60 receives various information from the controller 40 of the plurality of machine tools 1, and provides the plurality of machine tools 1 with information such as machining conditions. The computer 60 may be an ordinary computer other than a management computer.

Moreover, the spindle abnormality detection device 50 includes: a first sensor 71 such as an acceleration sensor attached to the spindle unit 4 as shown in FIG. 1 and FIG. 3; and a second sensor 72 such as a laser sensor attached to the X-Y table 22 or the like as shown in FIG. 1 and FIG. 2. Examples of such an acceleration sensor include a single-axis acceleration sensor, a two-axis acceleration sensor, and a three-axis acceleration sensor. In this embodiment, the first sensor 71 is attached to an outer peripheral surface of the spindle head 4b, and measures oscillation produced by the rotation of the spindle 4a. In this embodiment, a single-axis acceleration sensor is used as an example. The laser sensor is a reflective laser displacement meter, a laser Doppler vibrometer, or the like. In this embodiment, a reflective laser displacement meter is used as an example.

As shown in FIG. 5, the first sensor 71 and the second sensor 72 are connected to the computer 60, and detection results by the first sensor 71 and the second sensor 72 are sequentially transmitted to the computer 60.

Figure 6:
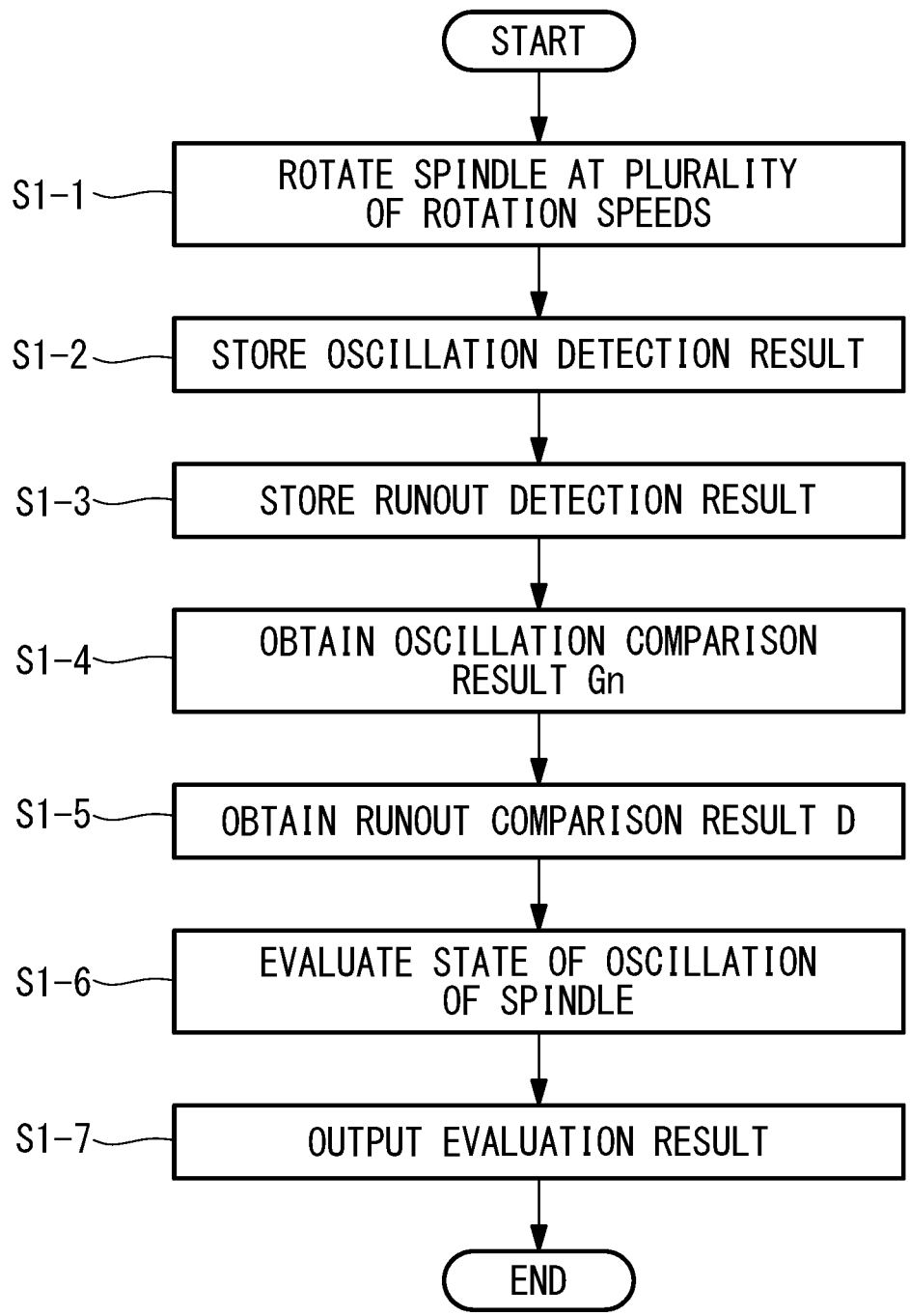
FIG. 6 is a flowchart of an example of a process by the spindle abnormity detection device according to this embodiment.

The computer 60 determines whether or not there is an abnormality in the spindle 4a, using the detection result obtained by the first sensor 71 and the detection result obtained by the second sensor 72. A process by the computer 60 for making the determination will be described with reference to a flowchart of FIG. 6.

First, the computer 60 transmits a signal for causing the machine tool 1 to rotate the spindle 4a sequentially at a plurality of rotation speeds (Step S1-1). With this, the controller 40 of the machine tool 1 controls the spindle motor 5a to rotate the spindle 4a, and sequentially rotates the spindle 4a at five rotation speeds of 100 rpm, 500 rpm, 1000 rpm, 5000 rpm, and 10000 rpm, for example. Here, the spindle 4a may be sequentially rotated at six or more rotation speeds, or at two or more and four or smaller rotation speeds.

In this embodiment, before rotating the spindle 4a as described above, the controller 40 controls the Z-axis motor 3b, the Y-axis motor 13, and the X-axis motor 23, and the tool T of the tool unit TU attached to the spindle 4a is arranged at a position at which a laser beam L from the second sensor 72 attached to the X-Y table 22 is irradiated to the tool T. With this, radial runout of the axis of the tool unit TU when the spindle 4a is rotated may be detected by the second sensor 72. Here, a laser beam may be irradiated to a different portion of the tool unit TU exposed from the spindle 4a. In this case, similarly, the radial runout of the axis of the tool unit TU is detected by the second sensor 72.

The transmission of signals in Step S1-1 may be performed daily at predetermined timing or may be at other predetermined timings. For example, the transmission of signals may be performed at timing at which a tool T is newly attached to the tool magazine 7.

Next, based on the oscillation storage program 63b, the computer 60 receives an oscillation detection result obtained by the first sensor 71 for each of the rotation speeds, and stores the received oscillation detection result for each rotation speed in the storage unit 63 (Step S1-2). The oscillation detection result stored in this manner is used as a standard of oscillation of the spindle 4a.

Further, based on the runout storage program 63c, the computer 60 receives a runout detection result obtained by the second sensor 72 for each of the rotation speeds, and stores the received runout detection result for each rotation speed in the storage unit 63 (Step S1-3). The runout detection result stored in this manner is used as a standard of runout of the tool T.

The computer 60 performs Step S1-1 to Step S1-3 every time when the predetermined timing comes.

Figure 7:
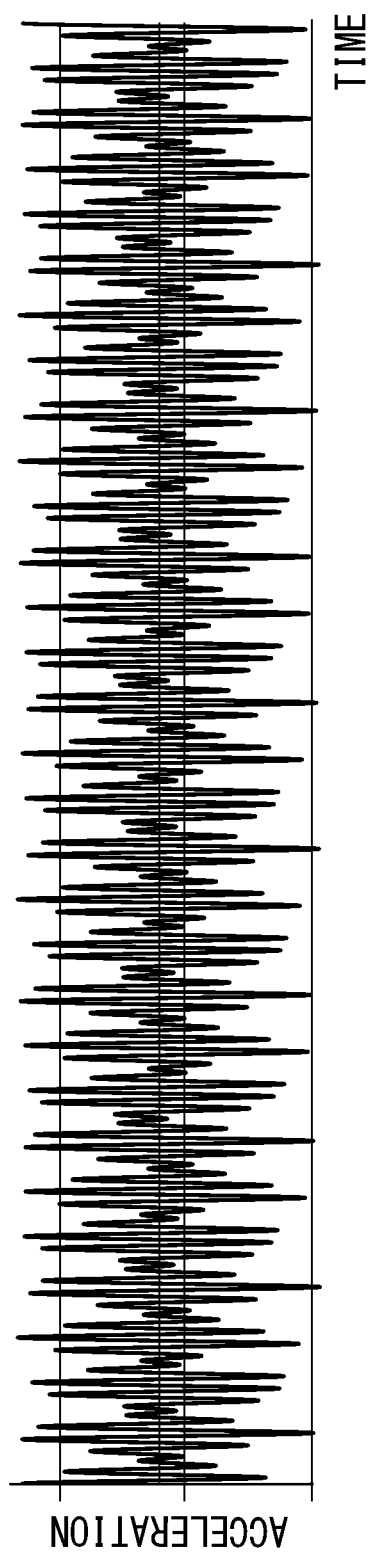
FIG. 7 is an example of a detection result obtained by a first sensor of the spindle abnormity detection device according to this embodiment.

It should be noted that in Step S1-2, while the detection result obtained by the first sensor 71 as shown in FIG. 7 may be stored in the storage unit 63 as the oscillation detection result for each rotation speed, data after analyzing the detection result obtained by the first sensor 71 may be stored in the storage unit 63 as the oscillation detection result.

As an example of the above analysis, a frequency analysis such as an FFT analysis is performed, for example. If the frequency analysis is performed to the detection result obtained by the first sensor 71 for each rotation speed, a frequency whose amplitude, acceleration, and the like of oscillation are large can be found out in the detection result of each of the rotation speeds. Consequently, regarding the detection result of each rotation speed, one or a plurality of frequencies whose amplitude, acceleration, and the like of oscillation are large, and the amplitude, the acceleration, and the like of the above frequency/frequencies become a result after the analysis, and the result is stored in the storage unit 63 as the oscillation detection result. In this embodiment, as one example, as shown in FIG. 8, regarding the detection result for each rotation speed, two frequencies whose acceleration of oscillation is large, as well as accelerations and amplitudes of these two frequencies are stored as the oscillation detection result. Here, for each rotation speed, a frequency whose oscillation level is the highest is represented by S1, and a frequency whose oscillation level is the second highest is represented by S2.

Further, in Step S1-3, in one example, for each rotation speed, a maximum value of the detection results obtained by the second sensor 72 is stored in the storage unit 63 as the runout detection result. For example, as shown in FIG. 9, a maximum value of runout for each rotation speed is stored in the storage unit 63. In FIG. 8 and FIG. 9, a measured value is applied in "*".

Next, based on the abnormity determination program 63d, the computer 60 performs a process of abnormity determination. The computer 60 compares a new oscillation detection result obtained by the first sensor 71 with the past oscillation detection result stored in the storage unit 63, and obtains an oscillation comparison result Gn that will be later described (Step S1-4). As shown in FIG. 8, for example, the past oscillation detection result is the oscillation detection result stored in the storage unit 63 for each rotation speed as the standard of oscillation.

In this embodiment, similarly to the case of FIG. 8, the new oscillation detection result is data after a frequency analysis is performed to the detection result obtained by the first sensor 71. The new oscillation detection result is an oscillation detection result stored in the storage unit 63 by performing Step S1-1 and Step S1-2, after the past oscillation detection result is stored. As shown in FIG. 10, the new oscillation detection result includes, in the detection result for each rotation speed, two frequencies whose acceleration of oscillation is large, as well as accelerations and amplitudes of these two frequencies. Here, for each rotation speed, a frequency whose oscillation level is the highest is represented by F1, and a frequency whose oscillation level is the second highest is represented by F2.

In Step S1-4, the computer 60 obtains the oscillation comparison result Gn based on an expression (1), for example.

$$|Fn-Sn|=Gn \quad (1)$$

Based on the expression (1), the oscillation comparison result Gn is obtained for each frequency of each rotation speed.

For the each of the obtained oscillation comparison result Gn, a score is determined based on a predetermined determination standard as shown in FIG. 10, for example. In FIG. 11, S10% corresponds to a value 10% of each Sn, and this also applies to S20% to S40%.

It should be noted that when frequencies of Fn and Sn applied to the expression (1) are different, a score of the oscillation comparison result Gn of this rotation speed is 0. As shown in FIG. 10, for example, a frequency of F2 at 100 rpm is 12.5 Hz, and this is different from any of frequencies of S1 and S2 at 100 rpm in FIG. 8. For example, when a dent is produced in the bearing B of the spindle 4a, a large oscillation occurs in a frequency other than a rotating primary or rotating secondary frequency of S1 and S2 in low-speed rotation. Finding out of such an abnormity is facilitated by largely reducing the score when frequencies of Fn and Sn are different.

Further, the computer 60 compares a new runout detection result obtained by the second sensor 72 with the past runout detection result stored in the storage unit 63, and obtains a runout comparison result D that will be later described (Step S1-5). As shown in FIG. 9, for example, the past runout detection result is the runout detection result stored in the storage unit 63 for each rotation speed as the standard of runout. The new runout detection result is a runout detection result stored in the storage unit 63 by performing Step S1-1 and Step S1-3, after the past runout detection result is stored.

The computer 60 calculates a difference between the new runout detection result and the past runout detection result as the runout comparison result D for each rotation speed, based on an expression (2), for example.

$$|\text{new runout detection result}-\text{past runout detection result}|=D \quad (2)$$

The computer 60 may determine that there is an abnormity in the runout of the tool unit TU when the runout comparison result D of any of the rotation speeds is over a predetermined standard. Here, the computer 60 may calculate a difference between the new runout detection result and a predetermined runout standard as the runout comparison result D. The predetermined runout standard may be 0 μm. In this manner, the computer 60 obtains the runout comparison result D that can be obtained by comparing the new runout detection result with the runout standard.

In this embodiment, the computer 60 determines a score for the runout comparison result D for each rotation speed. For example, a score when the runout comparison result D is smaller than a value a is assumed to be 100, a score when the runout comparison result D is equal to or greater than the value a and smaller than value b is assumed to be 80, a score when the runout comparison result D is equal to or greater than the value b and smaller than a value c is assumed to be 40, and a score when the runout comparison result D is equal to or greater than the value c is assumed to be 0.

Further, the computer 60 evaluates, as the abnormity determination of the spindle 4a, a state of oscillation of the spindle 4a including the tool unit TU, using the oscillation comparison result Gn and the runout comparison result D (Step S1-6). For example, the computer 60 may evaluate the state of oscillation of the spindle 4a, using an average value of the scores of the oscillation comparison results Gn for all rotation speeds, and an average value of the scores of the runout comparison results D for all rotation speeds.

Then, the computer 60 outputs an evaluation result in Step S1-6 (Step S1-7). As one example of the output, the computer 60 displays the evaluation result in the display unit 62 of the computer 60. As a different example, the computer 60 may transmit the evaluation result to a user's computer, or may transmit the evaluation result to the controller 40 of the machine tool 1. The controller 40 may display the received evaluation result in the display unit 42. Based on the received evaluation result, the controller 40 may restrict or stop an operation of the machine tool 1.

It should be noted that while the computer 60 is provided separately from the controller 40 of the machine tool 1 in this embodiment, the computer 60 may be provided within the controller 40. In this case, a part or all of a configuration of the computer 60 such as the processor 61 and the storage unit 63 may be common to a configuration of the controller 40 such as the processor 41 and the storage unit 43.

As described above, the spindle abnormity detection device 50 according to this embodiment includes: the first sensor 71 for measuring oscillation of the spindle 4*a* of the machine tool 1; and the second sensor 72 for measuring radial runout of the axis of the tool unit TU attached to the spindle 4*a*. Further, the spindle abnormity detection device 50 obtains the oscillation comparison result Gn by comparing the detection result obtained by the first sensor 71 with the oscillation standard of the spindle 4*a*. Moreover, the spindle abnormity detection device 50 obtains the runout comparison result D by comparing the detection result obtained by the second sensor 72 with the runout standard of the tool unit TU. Then, the spindle abnormity detection device 50 performs abnormity determination of the spindle 4*a* based on the oscillation comparison result Gn and the runout comparison result D.

In this embodiment, the abnormity determination of the spindle 4*a* is performed, for example, based on oscillation which is based on an abnormity of the bearing B of the spindle 4*a* and that the user may not easily notice, runout of the tool unit TU that the user may not easily notice, and the like. Accordingly, it is possible to prevent deterioration of manufacturing efficiency and an increase of manufacturing costs due to machining performed to the workpiece W without noticing an abnormity of the spindle 4*a*.

Further, in this embodiment, the plurality of oscillation detection results obtained by the first sensor 71 when the spindle 4*a* is sequentially rotated at the plurality of rotation speeds are stored in the storage unit 43 for the respective rotation speeds. Moreover, the plurality of runout detection results obtained by the second sensor 72 when the spindle 4*a* is sequentially rotated at the plurality of rotation speeds are stored in the storage unit 43 for the respective rotation speeds.

Finally, in this embodiment, the abnormity determination of the spindle 4*a* is performed using the oscillation detection result of each of the plurality of rotation speeds and the runout detection result of each of the plurality of rotation speeds.

The rotation speed of the spindle 4*a* when machining to the workpiece W is performed varies according to a type of machining, a request level of machining accuracy, a material of the workpiece W, and the like, and the rotation speed is determined arbitrarily by the user of the machine tool 1. In this embodiment, the abnormity determination of the spindle 4*a* is performed using the oscillation detection result and the runout detection result of each of the plurality of rotation speeds. Accordingly, it is possible to appropriately determine whether or not there is an abnormity in the spindle 4*a*, even when machining to the workpiece W is performed at an arbitrary rotation speed by the user.

It should be noted that in Step S1-6, the state of oscillation of the spindle 4*a* may be evaluated based on at least one oscillation comparison result Gn at a rotation speed equal to or smaller than 500 rpm, and at least one runout comparison result D at a rotation speed equal to or greater than 1000 rpm. When an abnormity such as a dent is produced within the bearing B supporting the spindle 4*a*, oscillation detected by the first sensor 71 when the spindle 4*a* is rotated at a low speed tends to become larger. Further, even when an abnormity such as a dent is produced within the bearing B, there is a case in which this abnormity does not give a large influence to oscillation of the spindle 4*a* rotating at a high speed. As a rotation speed equal to or smaller than 500 rpm is rarely used in usual machining, there is a case in which an operator on site may not notice the above phenomenon.

As described above, evaluating the oscillation comparison result Gn at a rotation speed equal to or smaller than 500 rpm leads to early detection of an abnormity of the bearing B of the spindle 4*a*. Here, it is more preferable to evaluate the oscillation comparison result Gn at a rotation speed equal to or smaller than 300 rpm.

On the other hand, there is a case in which runout of the tool unit TU increases at a rotation speed equal to or greater than 1000 rpm that is often used in machining. For example, when there is an abnormity in a fixation mechanism FM for fixing the tool unit TU of the spindle 4*a* (FIG. 3), runout of the tool unit TU increases in rotation at a high speed. For example, runout of the tool unit TU increases as described above, in such a case in which a force for pulling a pull stud bolt of the tool unit TU by a drawer 4*d* of the fixation mechanism FM is insufficient. As described above, evaluating the runout comparison result D at a rotation speed equal to or greater than 1000 rpm leads to early detection of an abnormity relating to runout of the tool unit TU.

In this case, in Step S1-2, a detection result obtained by the first sensor 71 for at least one rotation speed equal to or greater than 1000 rpm may be stored in the storage unit 63.

It should be noted that in Step S1-4, the above oscillation comparison result Gn may be obtained using one or a part of the plurality of oscillation detection results whose oscillation level is high, respectively corresponding to the plurality of rotation speeds. An example of the one oscillation detection result whose oscillation level is high is an oscillation detection result whose oscillation level is the highest among the plurality of oscillation detection results. As one example, the oscillation detection result whose oscillation level is high each exceed a predetermined oscillation level.

Further, in Step S1-5, the above runout comparison result D may be obtained using one or a part of the plurality of runout detection results whose runout level is high, respectively corresponding to the plurality of rotation speeds. An example of the one runout detection result whose runout level is high is a runout detection result whose runout level is the highest among the plurality of runout detection results. As one example, the runout detection result whose runout level is high each exceed a predetermined runout level.

Using only a part of the oscillation detection results and the runout detection results in this manner leads to an increased processing speed. On the other hand, as an oscillation detection result whose oscillation level is high and a runout detection result whose runout level is high are used, the evaluation in Step S1-6 is accurate.

It should be noted that while the oscillation detection results stored in the storage unit 63 for the respective rotation speeds are used as the oscillation standard in the above embodiments, an oscillation standard for each rotation speed may be determined in advance. Similarly, while the runout detection results stored in the storage unit 63 for the respective rotation speeds are used as the runout standard in the above embodiments, a runout standard for each rotation speed may be determined in advance.

It should be noted that in the above embodiments, it is also possible to perform abnormity determination of the spindle 4a by obtaining an oscillation detection result and a runout detection result at a certain rotation speed, and by comparing these results respectively with the oscillation standard and the runout standard. In this case, the same effects as described above may also be achieved.

It should be noted that in the above embodiments, the first sensor 71 and the second sensor 72 are provided in the spindle abnormity detection device 50. However, one or both of the first sensor 71 and the second sensor 72 may be provided in the machine tool 1. In this case, the computer 60 is also able to perform Step S1-2 to S1-7 described above based on the detection results obtained by the first sensor 71 and the second sensor 72, and to obtain the results as described above.

REFERENCE SIGNS LIST

1 Machine tool
2 Base
3 Column portion
4 Spindle unit
4a Spindle
4b Spindle head
7 Tool magazine
22 X-Y table
40 Controller
41 Processor
43 Storage unit
50 Spindle abnormity detection device
60 Computer
61 Processor
62 Display unit
63 Storage unit
63b Oscillation storage program
63c Runout storage program
63d Abnormity determination program
64 Input unit
65 Transceiving unit
71 First sensor
72 Second sensor
TU Tool unit
T Tool
W Workpiece

The invention claimed is:

1. A spindle abnormity detection device, comprising:
a first sensor attached to a spindle head of a spindle unit of a machine tool, the spindle head supporting a spindle in a rotatable manner, the first sensor configured to measure oscillation of the spindle head;
a second sensor attached to other than the spindle head and configured to measure, in a non-contact manner, radial runout of an axis of a tool unit attached to the spindle; and
a control unit configured to perform abnormity determination of the spindle unit based on an oscillation comparison result and a runout comparison result, the oscillation comparison result being obtained by comparing a detection result obtained by the first sensor with an oscillation standard of the spindle head, the runout comparison result being obtained by comparing a detection result obtained by the second sensor with a runout standard of the tool unit.

2. The spindle abnormity detection device according to claim 1, wherein
the control unit performs:
an oscillation storing process for storing a plurality of oscillation detection results obtained by the first sensor when the spindle is sequentially rotated at a plurality of rotation speeds, the oscillation detection results being stored to be respectively associated with the rotation speeds in a storage unit as the detection result; and
a runout storing process for storing a plurality of runout detection results obtained by the second sensor when the spindle is sequentially rotated at the plurality of rotation speeds, the runout detection results being stored to be respectively associated with the rotation speeds in the storage unit as the detection result.

3. The spindle abnormity detection device according to claim 2, wherein
the control unit performs:
a process for obtaining the oscillation comparison result by comparing each of the plurality of oscillation detection results with the oscillation standard; and
a process for obtaining the runout comparison result by comparing the plurality of runout detection results with the runout standard.

4. The spindle abnormity detection device according to claim 2, wherein
the control unit performs:
a process for obtaining the oscillation comparison result by comparing one or a part of the plurality of oscillation detection results with the oscillation standard, the one or the part of the oscillation detection results showing a high oscillation level; and
a process for obtaining the runout comparison result by comparing one or a part of the plurality of runout detection results with the runout standard, the one or the part of the runout detection results showing a high runout level.

5. The spindle abnormity detection device according to claim 1, wherein
the control unit performs:
a signal transmission process for transmitting a signal for sequentially rotating the spindle at a plurality of rotation speeds;
an oscillation storing process for storing a plurality of oscillation detection results obtained by the first sensor when the spindle is sequentially rotated at the plurality of rotation speeds, the oscillation detection results being stored to be respectively associated with the rotation speeds in a storage unit as the oscillation standard; and
a runout storing process for storing a plurality of runout detection results obtained by the second sensor when the spindle is sequentially rotated at the plurality of rotation speeds, the runout detection results being stored to be respectively associated with the rotation speeds in the storage unit as the runout standard.

6. The spindle abnormity detection device according to claim 1, wherein
the control unit performs the abnormity determination based on the oscillation comparison result obtained by comparing the detection result obtained by the first sensor when the spindle is rotated at a first rotation speed with the oscillation standard, and based on the runout comparison result obtained by comparing the detection result obtained by the second sensor when the spindle is rotated at a second rotation speed with the runout standard, the first rotation speed being equal to or smaller than 500 rpm, the second rotation speed being equal to or greater than 1000 rpm.

7. A spindle abnormity detection device, comprising:

a control unit having a processor, wherein the control unit performs abnormity determination of a spindle of a machine tool based on an oscillation comparison result and a runout comparison result, the oscillation comparison result being obtained by comparing a detection result obtained by a first sensor, which is attached to a spindle head supporting the spindle in a rotatable manner, with an oscillation standard of the spindle head, the runout comparison result being obtained by comparing a detection result obtained by a second sensor, which is attached to other than the spindle head, with a runout standard of a tool unit, the first sensor being configured to measure oscillation of the spindle head, the second sensor being configured to measure, in a non-contact manner, radial runout of an axis of the tool unit attached to the spindle.

* * * * *